United States Patent [19]
Joseph et al.

[11] Patent Number: 5,188,324
[45] Date of Patent: Feb. 23, 1993

[54] SELF-RETAINING MOUNTING BLOCK

[75] Inventors: Michael L. Joseph, Nashau, N.H.;
Steven G. Boulay, Shrewsbury;
Ronald W. Nasman, Winchendon,
both of Mass.

[73] Assignee: Digital Equipment Corporation,
Maynard, Mass.

[21] Appl. No.: 870,438

[22] Filed: Apr. 16, 1992

[51] Int. Cl.5 .............................................. A47B 96/06
[52] U.S. Cl. ................................... 248/222.3; 248/635
[58] Field of Search ................... 248/222.3, 634, 635;
403/195; 16/2; 174/152 G; 267/141.4

[56] References Cited

U.S. PATENT DOCUMENTS

| | | | |
|---|---|---|---|
| D. 293,880 | 1/1988 | Takahashi . | |
| 2,115,653 | 4/1938 | Snyder | 248/635 |
| 2,361,184 | 10/1944 | Ellis | 248/635 |
| 2,420,826 | 5/1947 | Irrgang | 16/2 X |
| 2,826,388 | 3/1958 | Janos et al. . | |
| 3,179,367 | 4/1965 | Rapata . | |
| 3,350,042 | 10/1967 | Stewart | 267/141.4 |
| 3,688,635 | 9/1972 | Fegen . | |
| 3,836,703 | 9/1974 | Coules . | |
| 3,921,261 | 11/1975 | Fisher . | |
| 3,986,780 | 10/1976 | Nivet . | |
| 4,179,977 | 12/1979 | van Buren, Jr. . | |
| 4,186,945 | 2/1980 | Hahn | 16/2 X |
| 4,474,489 | 10/1984 | Simon | 403/195 |
| 4,520,987 | 6/1985 | Eguchi | 248/635 |
| 4,522,378 | 6/1985 | Nelson | 16/2 X |
| 4,567,546 | 1/1986 | Zeller et al. . | |
| 4,685,172 | 8/1987 | O'Connor | 16/2 |
| 4,906,152 | 3/1990 | Kurihara . | |
| 4,936,066 | 6/1990 | Rutsche et al. . | |
| 4,969,065 | 11/1990 | Petri . | |

*Primary Examiner*—J. Franklin Foss
*Attorney, Agent, or Firm*—Ronald E. Myrick; Barry N. Young; Ronald C. Hudgens

[57] ABSTRACT

A mounting block is disclosed which may be inserted and retained in a standard double-D aperture of a panel. The mounting block has a body which conforms in size and shape to the aperture and two ledges which provide ledge retaining surfaces. The mounting block also has two rectilinear notches in the body which expose notch surfaces which are in parallel spaced apart relationship with the ledge retention surfaces. The mounting block is inserted into the aperture and rotated 90 degrees of lock the mounting block in its retention position. In the retention position, the panel is captured between the ledge retention surfaces and the notch surfaces. Thus retained in the aperture, the mounting block is suitable for supporting loads or providing attachment points for screws or other fasteners.

9 Claims, 6 Drawing Sheets

SELF-RETAINING MOUNTING BLOCK

FIELD OF THE INVENTION

This invention relates to a mounting arrangement for securement of a support within an aperture of a wall.

BACKGROUND OF THE INVENTION

In the manufacture of computer enclosures and other products which contain sheet metal or other types of panels, various parts within the product must often be attached to these panels. Typically, some of these parts may have to be attached to panels such that they stand off from the surface of the panel by a fixed distance.

In addition, panels are often used in a number of different products, or in variations of the same product. Each product, or product variation, may contain different parts, and may require that the parts be attached in different locations on the panel. Similarly, different stand off heights may also be required.

A common method for providing stand off support from a sheet metal panel is the formation of a right angle bracket on the panel. Such a bracket is typically formed by making a U-shaped cut in the sheet metal panel and forming the interior portion of the 'U' such one segment extends normally from the sheet metal surface and the other segment extends parallel to, but spaced apart from, the sheet metal surface. A hole is generally formed in the parallel segment of the bracket to provide an attachment point for screws or other fasteners. An advantage of the right angle bracket is an attachment point which stands off from a panel surface without requiring any additional components.

Right angle brackets formed from sheet metal panels have disadvantages for certain applications. First, the manufacturing processes used to form them are not as positionally accurate as simple sheet metal stamping. Therefore, while the U-shaped cut and the attachment point hole may be made precisely, the position of the hole after forming the bracket, relative to the panel surface, is less accurate. In addition, where the panel may be used in a number of products or product variations, one bracket must be formed for each potential attachment point. Because the bracket stands off of the panel surface, unused brackets may interfere with other parts of the finished product. Finally, the process of manufacturing the bracket is a relatively expensive one.

Therefore, it is desirable to have an inexpensive arrangement for providing accurately positioned attachment points to a panel which stand off from the panel surface. It is also desirable that the attachment arrangement be suitable for providing potential attachment points that, when not in use, do not create mechanical interferences or obstructions. It is further desirable that the attachment arrangement be capable of providing attachment points where access is available on only one side of the panel. Finally, it is also desirable that the attachment arrangement be electrically insulating and require no alteration of the panel beyond the creation of an industry standard double-D aperture in a panel.

SUMMARY OF THE INVENTION

The above stated and other shortcomings in the prior art are overcome by the claimed invention.

In a broad aspect, the invention relates to a mounting block for insertion and retention in a double-D aperture in a panel. The mounting block has a body which conforms in size and shape to the panel aperture and two ledges which extend normal from the body and to provide ledge retention surfaces. The mounting block further comprises two rectilinear notches formed in the body which expose notch surfaces being in parallel spaced apart relationship with the ledge retention surfaces. The mounting block is retained in the aperture by inserting it into the aperture and rotating the mounting block 90 degrees into a rotated retention position. The mounting block is suitable for supporting loads or providing attachment points for screws or other fasteners.

In another aspect, the invention relates to a mounting block having a lobe positioned such that the ledges are located between the lobe and the body. The lobe is suitable for supporting loads or providing attachment points for screws or other fasteners. Such a mounting block, which may be inserted into the aperture (as explained hereinabove) from the same side of the panel from which the lobe protrudes, is suitable for use where access to only one side of the panel is available.

In a preferred form, the mounting block is constructed from a resilient plastic effective for electrical insulation.

These and other features and advantages of the present invention will become apparent from a reading of the detailed description in conjunction with the attached drawings.

DETAILED DESCRIPTION OF THE PREFERRED EMBODIMENT

Figure 1:
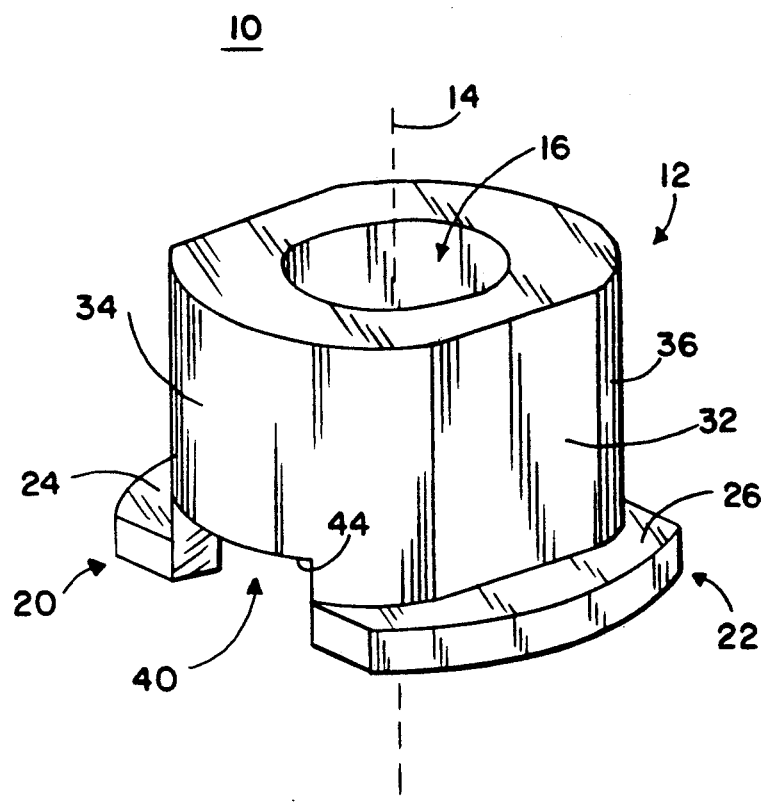
FIG. 1 is an isometric view of a mounting block in accordance with the principles of the invention.
Figure 2:
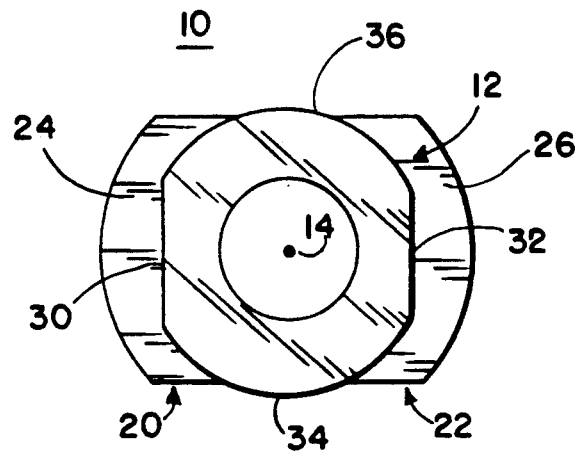
FIG. 2 is a plan view of the mounting block of FIG. 1.

FIGS. 1 through 4 show a unitary mounting block 10, having a cylindrical passageway 16 extending therethrough, that includes a body 12 and two ledges 20 and 22. As shown, the body 12 has a center axis 14 and two pairs of opposing external body surfaces 30, 32, 34, and 36. The opposing body surfaces 30 and 32 are planar and extend parallel to each other. The other pair of opposing body surfaces 34 and 36 are convex and also extend parallel to each other. Each of the body surfaces 30, 32, 34, and 36 extend parallel to the center axis 14 of the body 12.

As shown, each of the two ledges 20, 22 extends away from its corresponding planar body surface 30 and 32 respectively. Also, the ledges 20 and 22 extend to a portion of the convex body surfaces 34 and 36, and each ledge 20 and 22 has a ledge retaining surface 24 and 26. The ledge retaining surfaces 24 and 26 extend normal to the center axis 14 of the body 12, and are coplanar.

Figure 3:
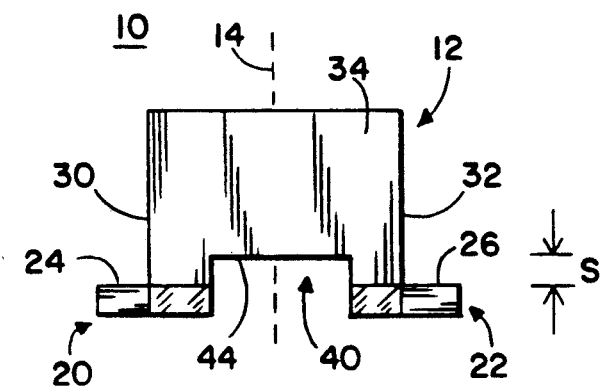
FIG. 3 is an elevation view of one of the two convex body surfaces of the mounting block of FIG. 1.
Figure 4:
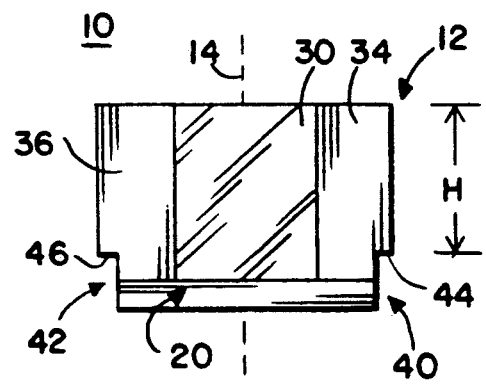
FIG. 4 is an elevation view of one of the two planar body surfaces of the mounting block of FIG. 1.

The mounting block 10 includes rectilinear notches 40 and 42 formed in the two convex body surfaces 34 and 36 respectively. The notches 40 and 42 extend between the ends of the ledges 20, 22 and form notch surfaces 44 and 46 in the wall of the body 12 at the two convex body surfaces 34 and 36. The notch surfaces 44 and 46 extend in a direction normal to the center axis 14 of the body 12, and are co-planar. Further, the notch surfaces 44 and 46 each face in an opposite direction from, and are in spaced apart relation with, the ledge retaining surfaces 24 and 26. In FIG. 3, the surface spacing 'S' represents the distance between the notch surfaces 44 and 46 and the ledge retaining surface 24 and 26.

As shown in the Figures, the mounting block 10 is formed from a resilient plastic which is shaped by injection molding. The plastic used in the mounting block 10 of the Figures is a 10 percent glass-filled polycarbonate. Mounting blocks may also be formed from other plastics, composite materials, metal, or the like. In addition, mounting blocks may be shaped by molding, machining, or other suitable manufacturing processes.

Figure 5:
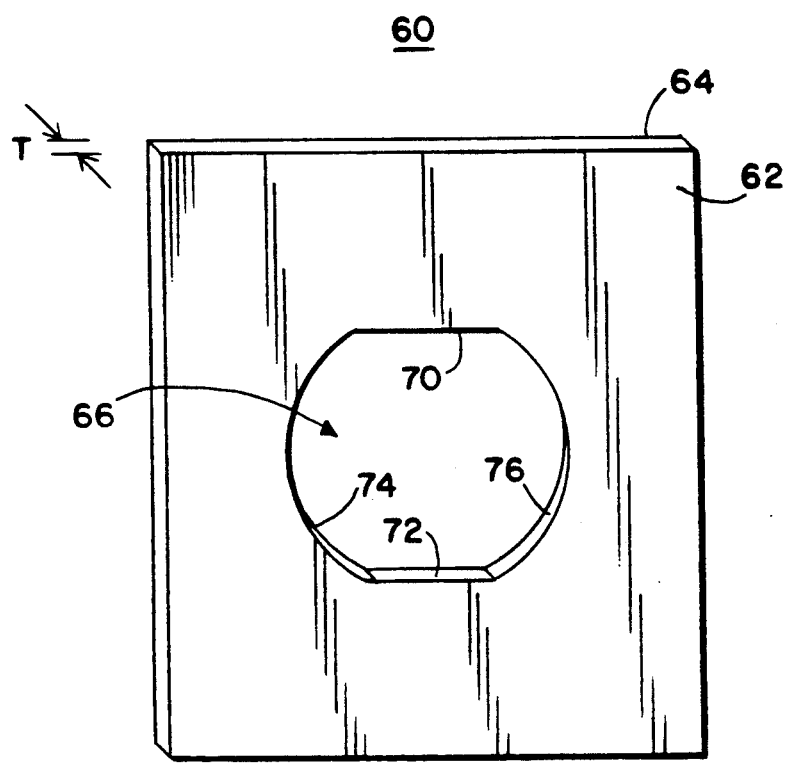
FIG. 5 is an isometric view of a panel with a double-D shaped aperture for use with the mounting block of FIG. 1.

FIG. 5 shows an isometric view of a panel 60 having an aperture 66. The panel has two major surfaces 62, 64 which are spaced apart by the thickness of the panel 60. The thickness of the panel 60 is labeled 'T' in FIG. 5. The aperture 66 is defined by two pairs of opposing sides 70, 72, 74, and 76. The opposing sides 70 and 72 forming the first pair are linear and spaced apart from and generally parallel to each other. The other two opposing sides 74 and 76 are arcuate and spaced apart from each other. The arcuate sides 74 and 76 are curved so as to define concave portions of the aperture 66.

The aperture 66 is known generally as a double-D aperture. In a double-D aperture, the arcuate sides 74 and 76 are defined by symmetrical cords of a circle. The other sides 72 and 74 are substantially linear, are parallel to each other and are equally spaced from the center of the circle defining the arcuate sides 74 and 76. The end points of the linear sides 72 and 74 are defined by the end points of the arcuate sides 74 and 76. The size and shape of the aperture 66 generally conforms to the body surfaces 30, 32, 34, and 36 of the mounting block 10.

Figure 6:
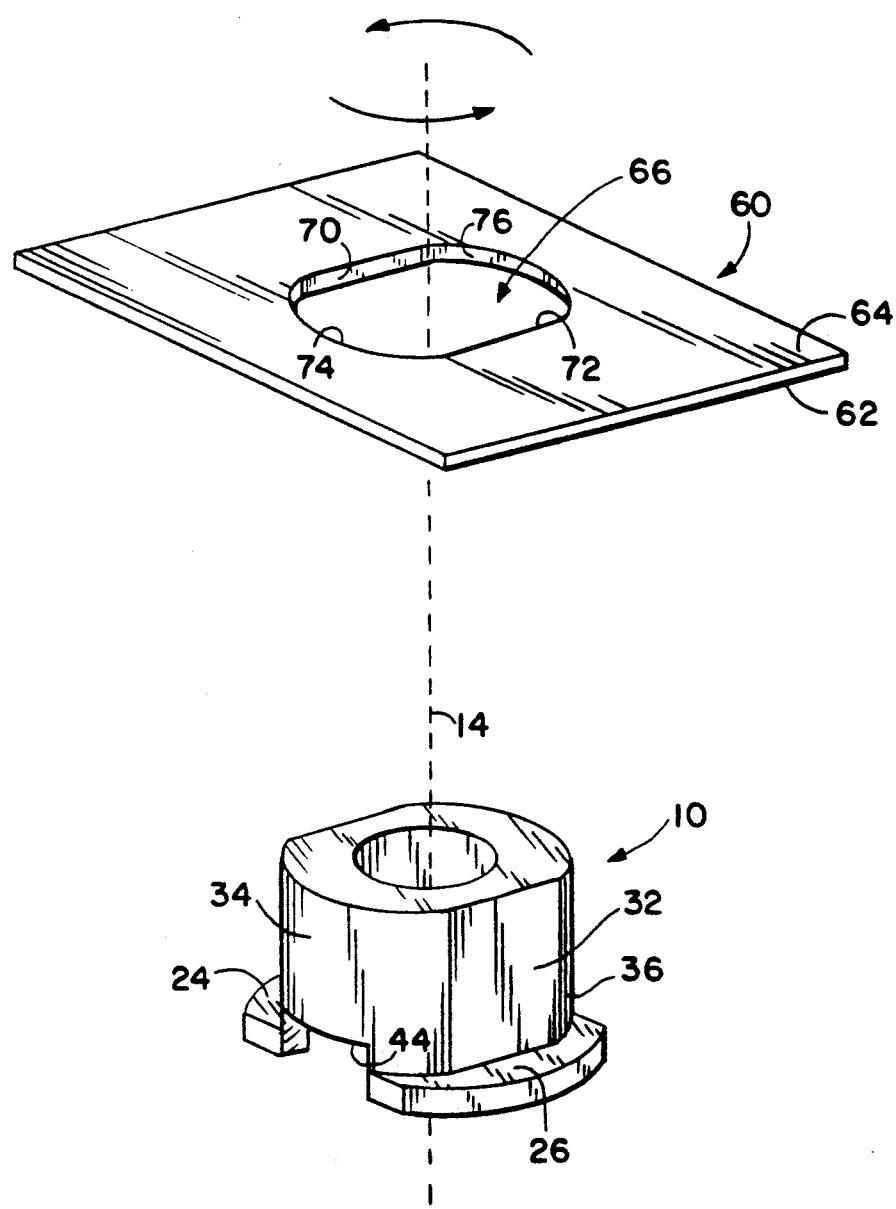
FIG. 6 is an isometric view of the mounting block of FIG. 1 positioned for insertion into the double-D aperture in the panel of FIG. 5.

FIG. 6 shows the mounting block 10 positioned for mounting on the panel 60 by insertion into the aperture 66. The center axis 14 of the body 12 is aligned with the center of the of the aperture 66. The planar body surfaces 30, 32 are also aligned with the linear sides 70 and 72 and the convex body surfaces 34 and 36 are aligned with the arcuate concave sides 74 and 76.

After alignment with the aperture 66, the mounting block 10 is inserted into the aperture 66 such that the ledge retaining surfaces 24 and 26 are opposed to and in contact with a major surface 62 of the panel 60. The notch surfaces 44 and 46 are positioned parallel to the other major surface 64 of the panel 60. The surface spacing 'S', shown in FIG. 3, is equal to or exceeds the panel thickness 'T', shown in FIG. 5. These relative dimensions insure that the thickness of the panel 60 can be accommodated between the ledge retaining surfaces 24 and 26 on one side of the panel 60, and the notch surfaces 44 and 46 on the other side of the panel 60.

The size and shape of the body surfaces 30, 32, 34, and 36 of the mounting block 10 generally conform to the dimensions of the aperture 66. As shown in FIG. 5, the double-D aperture 66 is defined by linear sides 70 and 72 which are spaced apart by approximately 0.45 inches. Correspondingly, the distance between the outer surfaces of the planar body surfaces 30 and 32 is approximately 0.435 inches. The aperture 66 is further defined by arcuate sides 74, 76 which are defined by a circle having a diameter of 0.50 inches. Correspondingly, the outer surfaces of the convex body surfaces 34 and 36 are defined by a cylinder having a diameter of approximately 0.480 inches. Dimensional tolerances of approximately +/−0.005 inches are typical.

The mounting block 10 is locked in place, and thereby retained within the aperture 66 of the panel 60, by a relative rotation of 90 degrees with respect to the panel 60. The axis of this rotation is the center axis 14 of the body 12. In its rotated retention position, the mounting block 10 can neither be pushed further through the aperture 66 nor withdrawn from the aperture 66. The ledge retaining surfaces 24 and 26 prevent the mounting block 10 from being pushed further into or through the aperture by interfering with a major surface 62 of the panel 60 in the regions adjoining the arcuate sides 74 and 76 which define the aperture 66. The notch surfaces 44 and 46 prevent the mounting block 10 from being withdrawn from the aperture 66 by interfering with the opposite major surface 64 of the panel 60 in the regions adjoining the linear sides 70 and 72 which define the aperture 66. Thus, translation of the mounting block 10 along the center axis 14 is limited to the difference between the dimensions 'S', the surface spacing of the mounting block 10, and 'T', the thickness of the panel 60. In the embodiment shown, 'S' is approximately 0.05 inches and 'T' is approximately 0.047 inches.

Figure 7:
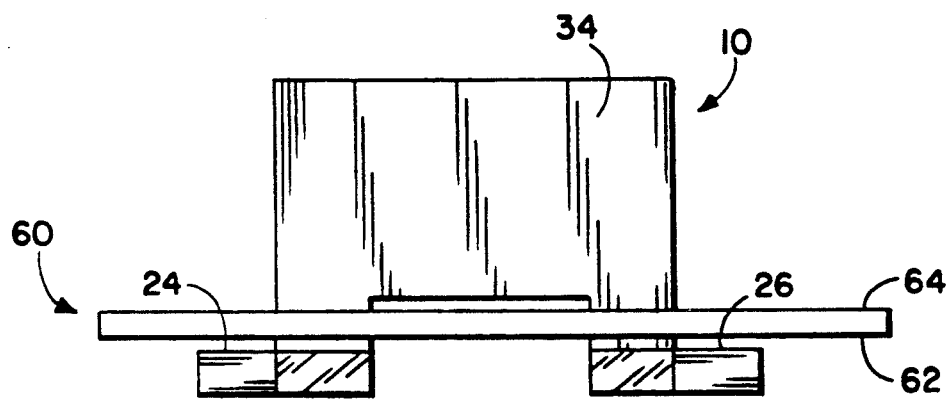
FIG. 7 is an elevation view of the mounting block of FIG. 1 in its rotated retention position within the double-D aperture of the panel of FIG. 5.
Figure 8:
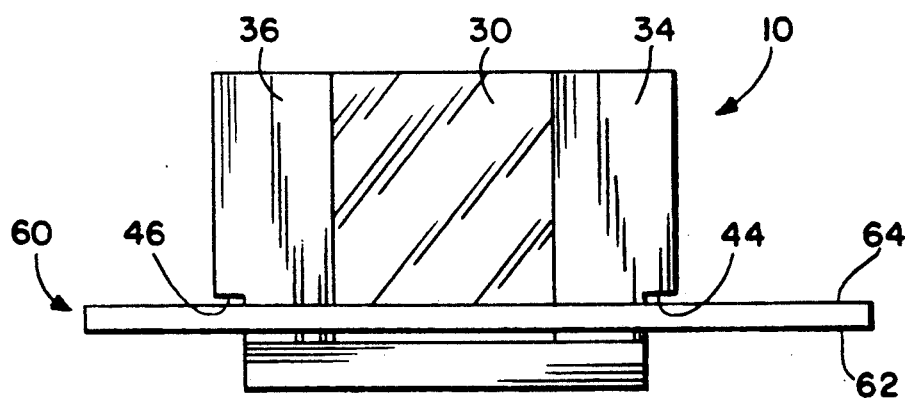
FIG. 8 is another elevation view of the mounting block of FIG. 1 in its rotated retention position within the double-D aperture of the panel of FIG. 5.

FIGS. 7 and 8 show elevation views of the mounting block 10 in its 90 degree, or one quarter turn, rotated retention position within the aperture 66. FIG. 7 shows the ledge retaining surfaces 24 and 26 in opposition the major surface 62 of the panel 60, thereby preventing the mounting block 10 from being further inserted into or through the aperture 66. FIG. 8 shows the notch surfaces 44 and 46 in opposition to the other major surface 64 of the panel 60, thereby preventing the mounting block 10 from being withdrawn from the aperture 66 while the mounting block 10 is in its rotated retention position.

In its rotated retention position, the mounting block 10 is also retained in the aperture 66 such that the translation of the mounting block 10 parallel to the major surfaces 62 and 64 of the panel 60 is limited. This translation is limited by the interference of the body surfaces 30, 32, 34, and 36 with the sides 70, 72, 74, and 76 which define the aperture 66.

Thus, in its rotated retention position, the mounting block 10 is positively retained in the aperture 66 and cannot be translated relative to the panel 60. Being retained in the panel 60, the mounting block 10 may thereby be used for a variety of purposes. In the drawings, the mounting block includes a passageway 16 along the center axis 14 for receiving screws or other fastener types (not shown). With such a fastener, the mounting block 10 may be used to join a component (not shown), such as a printed circuit board for a computer, to the panel 60 while maintaining a specified distance between the component and the panel 10. This distance is specified by the dimensions of the body 12 which is labeled 'H' in FIG. 4. In the embodiment shown in FIGS. 1 through 8, 'H' is approximately 0.25 inches. Under other circumstances, such as where the mounting block 10 is to support a load, it may be advantageous that the body 12 be solid, without a passageway 14.

The mounting block 10, retained in the aperture 66 of the panel 60, may also be used for other purposes, including the provision of mechanical support. Where the panel 60 is oriented vertically, the mounting block 10 protrudes from the aperture 66 horizontally and may be used to support a load (not shown) which can rest on the top surface of the mounting block 10 or can hang from the mounting block 10.

The mounting block 10 is retained in the aperture 66 such that it resists rotation relative to the panel 60. Using the specified dimensions for the mounting block 10 and for the double-D aperture 66 as shown, the regions of the convex body surface 34 and 36 adjacent to the notches 40 and 42 interfere with the arcuate sides 74 and 76 when the mounting block 10 is rotated relative to the panel 60. However, the resilient plastic material of the mounting block 10 allows it to deform somewhat during rotation, thereby allowing rotational movement into the rotated retention position. After being rotated into its rotated retention position, the resilient plastic mounting block 10 substantially returns to its original shape. The notches 40, 42 further aid in allowing this deformation. Because the mounting block 10 must deform somewhat to rotate into or out of the rotated retention position, the mounting block 10 is, in a real sense, locked in place when in the rotated retention position. A tool (not shown) may be used to assist in the rotation of the mounting block 10. The tool may grasp the planar body surfaces 30 and 32, or may engage conventional tooling features on the interior (not shown) of the mounting block 10.

Alternatively, the mounting block 10 may be formed from a non-deforming material and the panel 60 may be formed from a resilient material. Using these material choices, it is the panel 60 which deforms somewhat during the rotation of the mounting block 10 into the rotated retention position and then substantially returns to its original shape. Similarly, materials may be selected such that both the mounting block 10 and the panel 60 deform somewhat during rotation.

Figure 9:
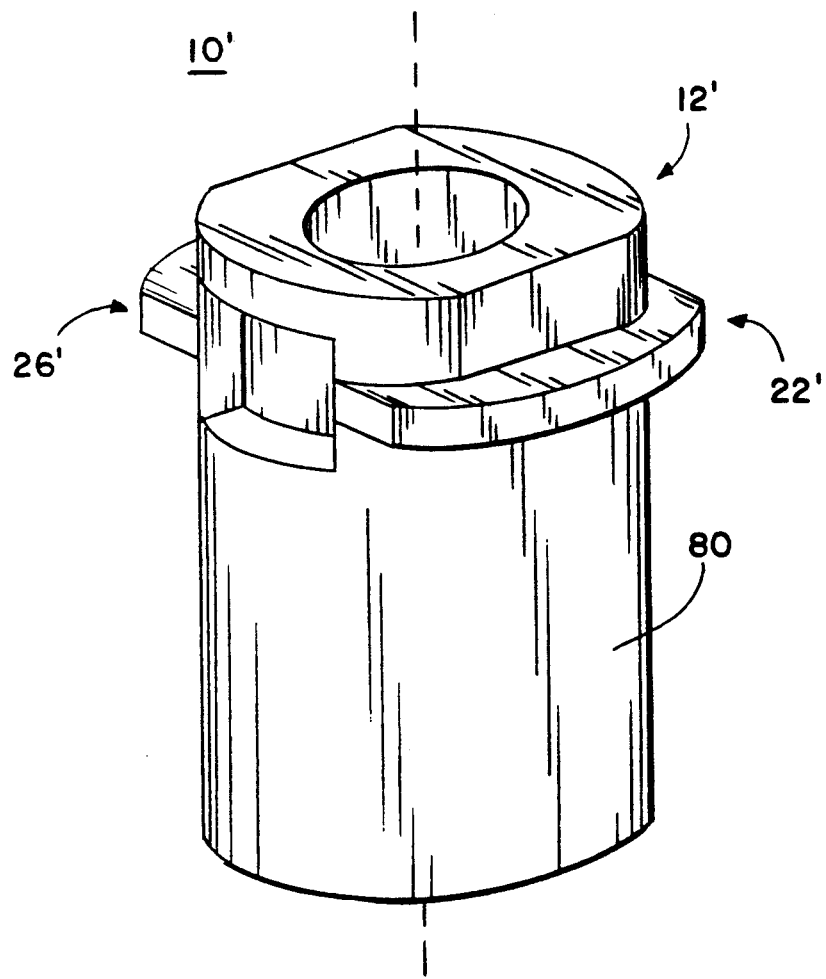
FIG. 9 is an isometric view of another embodiment of a mounting block in accordance with the principles of the invention.

FIG. 9 shows another embodiment of a mounting block in accordance with the principles of the invention. As shown, a mounting block 10' has an inside lobe 80. The body 12' has the same shape as the body 12 of FIGS. 1 through 8, although the dimension 'H', shown in FIG. 4, may differ. The lobe 80 may be used for any function for which the body 12 of the mounting block 10 is suitable, including supporting loads or capturing fasteners (not shown). The lobe 80 and mounting block 10' are most useful, however, where access is available to only one side of the panel 60. Using the mounting block 10 of FIGS. 1 through 8, the mounting block 10 is inserted from one side of the panel 60 and the body 12 protrudes from the opposite side of the panel 60. The mounting block 10' of FIG. 9, however, is inserted from the same side of the panel 60 from which the lobe 80 protrudes. Thus, the mounting block 10' can support loads or capture fasteners on one side of the panel 60 without requiring access to the other side of the panel 60 during insertion of the mounting block 10'.

While specific embodiments of the invention have been shown and described in detail to illustrate the application of the invention principles, it will be apparent that the invention may be embodied otherwise without deviating from the invention set forth in the following claims.

What is claimed is:

1. A mounting block for insertion and retention in a double-D aperture in a panel comprising:

a body having a center axis and two pairs of opposing external body surfaces extending parallel to the center axis, one pair of body surfaces being planar and parallel to each other, the other pair of body surfaces being convex and extending parallel to each other, the body size and shape conforming to the aperture;

a ledge extending away from each of the planar body surfaces, each ledge having a ledge retaining surface extending generally normal to the center axis of the body, the ledge retaining surfaces being co-planar;

a rectilinear notch formed in each of the convex sides, the notches extending between the ends of the ledges, each of the notches exposing a notch surface in the body at each of the convex body surfaces, the notch surfaces being in parallel spaced apart facing relation with the ledge retaining surfaces and offset therefrom, the notch surfaces being approximately coplanar, the ledge retaining surfaces and the notch surfaces being effective to engage opposing major surfaces of the panel upon insertion of the body into the aperture and rotation of the mounting block approximately one quarter turn about the center axis into the rotated retention position.

2. The mounting block of claim 1 wherein the ledges are positioned at one end of the body of the mounting block.

3. The mounting block of claim 2 further comprising a lobe, the lobe being positioned such that the ledges are located between the lobe and the body.

4. The mounting block of claim 1 wherein the mounting block is formed from an electrically insulating material.

5. The mounting block of claim 4 wherein the mounting block is formed from a glass-filled polycarbonate.

6. The mounting block of claim 1 further comprising a passageway for holding a fastener.

7. The mounting block of claim 1 wherein the mounting block is formed from a resilient material so that the mounting block deforms slightly during rotation into the rotated retention position, and substantially returns to its original shape after the rotation.

8. The mounting block of claim 1 wherein the panel is formed from a resilient material so that the panel deforms slightly during rotation of the mounting block into the rotated retention position, and the panel substantially returns to its original shape after the rotation.

9. The mounting block of claim 1 wherein the notch surfaces are offset from the ledge retaining surfaces by approximately 90 degrees.

* * * * *